US011827361B2

(12) United States Patent
Warren et al.

(10) Patent No.: US 11,827,361 B2
(45) Date of Patent: Nov. 28, 2023

(54) POWERED SEAT-BASE RELEASE SYSTEM

(71) Applicant: Textron Innovations, Inc., Providence, RI (US)

(72) Inventors: Paul Stokholm Warren, Valley Center, KS (US); Stephen Howard Fagan, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 113 days.

(21) Appl. No.: 17/476,924

(22) Filed: Sep. 16, 2021

(65) Prior Publication Data

US 2022/0089288 A1 Mar. 24, 2022

Related U.S. Application Data

(60) Provisional application No. 63/082,070, filed on Sep. 23, 2020.

(51) Int. Cl.
*B60N 2/06* (2006.01)
*B64D 11/06* (2006.01)
*B60N 2/08* (2006.01)
*B60N 2/14* (2006.01)

(52) U.S. Cl.
CPC ........ *B64D 11/06395* (2014.12); *B60N 2/062* (2013.01); *B60N 2/08* (2013.01); *B60N 2/14* (2013.01); *B64D 11/0696* (2013.01)

(58) Field of Classification Search
CPC .......... B64D 11/06395; B64D 11/0696; B60N 2/062; B60N 2/08; B60N 2/14
See application file for complete search history.

(56) References Cited

U.S. PATENT DOCUMENTS

| 5,352,020 | A | * | 10/1994 | Wade | B64D 11/06395 |
| | | | | | 297/423.26 |
| 7,108,325 | B2 | * | 9/2006 | Williamson | B60N 2/08 |
| | | | | | 297/344.22 |
| 7,152,922 | B2 | | 12/2006 | Garland | |
| 8,047,595 | B2 | | 11/2011 | Bach | |
| 8,727,440 | B1 | | 5/2014 | Giasson et al. | |
| 9,744,881 | B2 | * | 8/2017 | Ferguson | F16H 21/40 |
| 9,908,446 | B2 | | 3/2018 | Davis et al. | |
| 9,981,571 | B2 | | 5/2018 | Garing | |
| 10,155,590 | B2 | * | 12/2018 | Davis | B60N 2/938 |

* cited by examiner

*Primary Examiner* — Philip F Gabler
(74) *Attorney, Agent, or Firm* — Avek IP, LLC

(57) ABSTRACT

A powered seat-base release system includes a rod rotatably mounted in a bucket assembly of an aircraft seat and a motor mechanically coupled to the rod. The motor is configured for rotating the rod from a locked position to a released position. A locking mechanism is configured for preventing motion of the bucket assembly. A cable has a first end and a second end, the first end being mechanically coupled to the rod, and the second end being mechanically coupled to the locking mechanism. A user interface is configured to activate the motor for rotating the rod to the released position such that the rod pulls the cable thereby releasing the locking mechanism to enable motion of the bucket assembly. Upon deactivation of the motor, a biasing mechanism is configured to counter rotate the rod from the released position to the locked position thereby back driving the motor.

16 Claims, 4 Drawing Sheets

POWERED SEAT-BASE RELEASE SYSTEM

CROSS-REFERENCE TO RELATED APPLICATIONS

This application claims the benefit of U.S. Provisional Patent Application No. 63/082,070 entitled "Powered Seat-Base Release System" and filed on Sep. 23, 2020, which is herein incorporated by reference in its entirety.

BACKGROUND OF THE INVENTION

1. Field

The disclosed embodiments relate generally to the field of aircraft seating. More specifically, the disclosed embodiments relate to a powered system for releasing a locking mechanism of a moveable seat base.

2. Description of the Related Art

Many types of seat locking mechanisms have been previously described. For example, U.S. Pat. No. 9,908,446 to Davis discloses an electric motor assembly for a seat locking mechanism such that the motor rotates a tube to pull a cable that releases a brake assembly, allowing the seat to move. U.S. Pat. No. 8,047,595 to Bach discloses a powered actuator system for locking and unlocking a latch on a seat base in a motor vehicle. U.S. Pat. No. 7,152,922 to Garland discloses a powered remote activation device for toggling an adjustment mechanism device between a locked and unlocked position for use with a motor vehicle seat. U.S. Pat. No. 9,981,571 to Garing discloses a cable release mechanism for moving an aircraft passenger seat between upright and reclined positions using a lockable gas spring. U.S. Pat. No. 8,727,440 to Giasson discloses an aircraft seat with forward/aft tracking, inboard/outboard tracking, and swivel movements, and a locking mechanism that can be motorized or manually operated.

SUMMARY

In an embodiment, a powered seat-base release system includes: a rod rotatably mounted in a bucket assembly of an aircraft seat; a motor mechanically coupled to the rod, wherein the motor is configured for rotating the rod from a locked position to a released position; a locking mechanism configured for preventing motion of the bucket assembly; a cable having a first end and a second end, the first end being mechanically coupled to the rod, and the second end being mechanically coupled to the locking mechanism; a user interface configured to activate the motor for rotating the rod to the released position such that the rod pulls the cable thereby releasing the locking mechanism to enable motion of the bucket assembly; and a biasing mechanism, wherein upon deactivation of the motor, the biasing mechanism is configured to counter rotate the rod from the released position to the locked position thereby back driving the motor.

In another embodiment, a motorized system for unlocking a seat assembly includes: a seat assembly including: a first frame member longitudinally aligned with a second frame member; a rod oriented transversely between the first frame member and the second frame member, wherein each end of the rod is rotationally coupled to the first frame member and the second frame member, respectively; a support member oriented transversely between the first frame member and the second frame member, wherein the support member is mechanically secured to the first frame member and the second frame member; a motor mounted to the support member and operatively coupled to the rod, wherein the motor upon being activated rotates the rod from a first position to a second position and holds the rod at the second position; a locking mechanism configured for preventing a position adjustment of the seat assembly in a locked orientation; a cable mechanically coupled between the rod and the locking mechanism, wherein upon the motor being activated the rod is rotated from the first position to the second position thereby pulling the cable to unlock the locking mechanism and enable position adjustment of the seat assembly; and a biasing mechanism, wherein upon the motor being deactivated, the biasing mechanism counter rotates the rod to the first position thereby back driving the motor and releasing the cable such that the locking mechanism returns to the locked orientation for once again preventing position adjustment of the seat assembly.

In yet another embodiment, a seat locking system includes: a seat base having a pair of frame members aligned longitudinally and a rotatable rod oriented transversely between the pair of frame members; an electric motor capable of being reverse driven, wherein the rotatable rod is rigidly fixed from a locked orientation to an unlocked orientation and hold the rotatable rod at the unlocked orientation without overheating; a user interface configured to receive a user input and transmit signals to the motor for activating or deactivating the motor based on the user input; upon the motor being activated via the user interface, the motor rotates the rotatable rod to the unlocked orientation thereby enabling a position adjustment of the seat base; and a biasing mechanism configured to counter rotate the rotatable rod, wherein upon the motor being deactivated via the user interface, the biasing mechanism counter rotates the rotatable rod and reverse drives the motor to the locked orientation for preventing position adjustment of the seat base.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
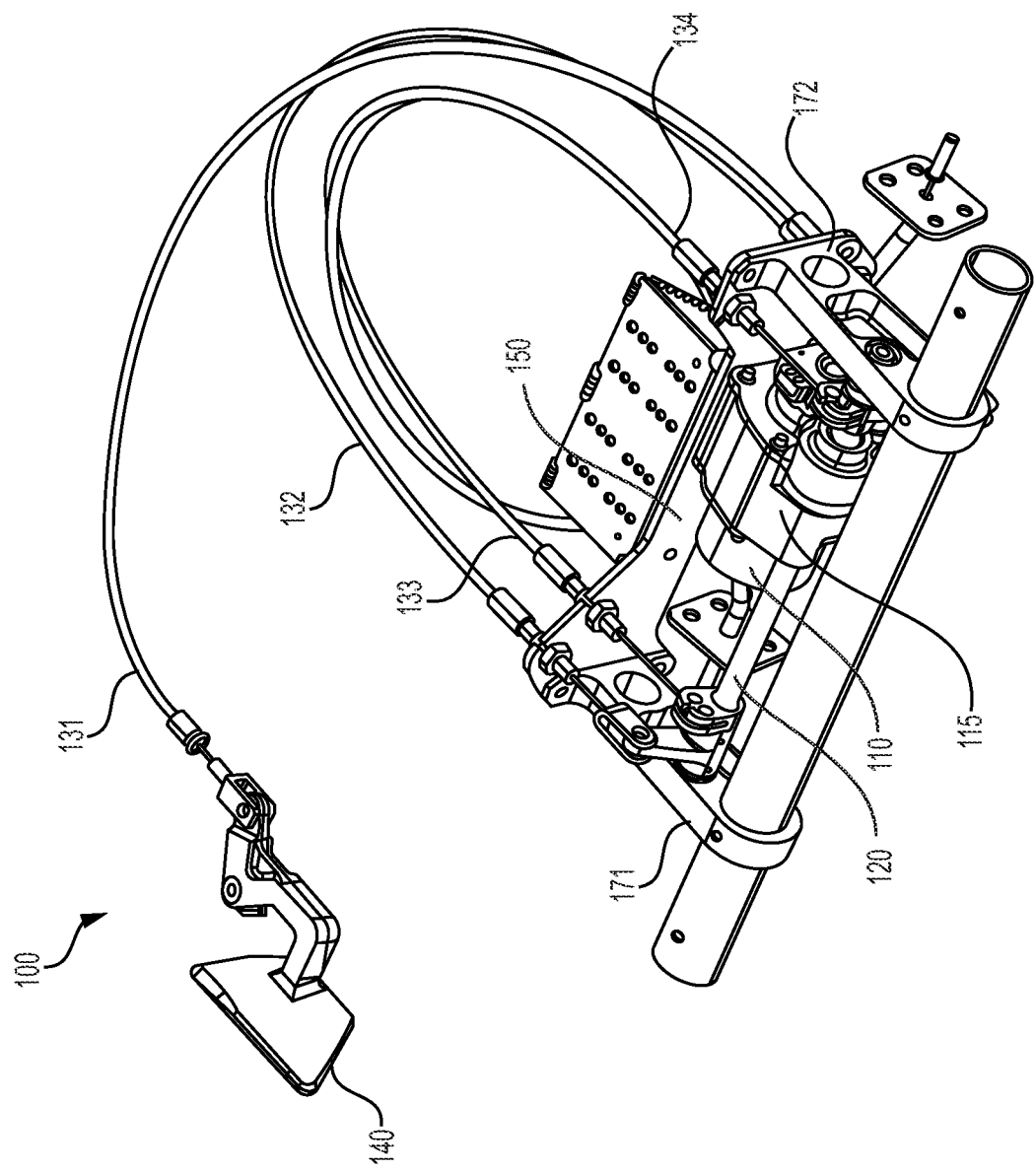
FIG. 1 is a perspective view showing a powered seat-base release system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft seats that enable advanced seat movements (e.g., forward/aft tracking, inboard/outboard tracking, and swiveling) utilize a locking mechanism within the seat base for preventing seat movement (e.g., during takeoff, landing, and turbulence). To release the locking mechanism and thereby permit movement of the seat, a mechanical lever-handle is commonly provided that enables a user to provide a mechanical force for releasing the locking mechanism. The mechanical force must overcome the force needed to release the locking mechanism as well as additional resistance due to cable friction, spring tension, assembly variations, and/or other mechanical losses. In addition, the mechanical force needed may vary over time due to different operating temperatures and/or wear. In some instances, the mechanical force needed may exceed twenty-five pounds of force.

Embodiments of the present disclosure provide a powered seat-base release system that includes a motor configured for releasing at least one locking mechanism of the seat base. In some embodiments, the powered seat-base release system provides all of the mechanical force needed to release the at least one locking mechanism. In other embodiments, the powered seat-base release system is configured to provide a power assist. The power-assist embodiment provides a portion of the mechanical force needed to release the at least one locking mechanism via the motor, while the remaining force is provided by the user via a mechanical lever-handle.

FIG. 1 is a perspective view showing an exemplary powered seat-base release system 100. System 100 may be installed in a bucket assembly, which is a lower portion of an aircraft seat (e.g., beneath the seat bottom) that mechanically couples to a seat base mounted to a floor. Not all components of the bucket assembly are depicted in FIG. 1 for clarity of illustration. A motor 110 mechanically couples to a rod 120 and is configured to rotate rod 120 between a locked position and a released position. Rod 120 is for example a control rod, a splined shaft, or a hollow tube such as a seat-torque tube. Rod 120 may be oriented transversely between two longitudinally aligned seat frame members (e.g., a first frame member 171 and a second frame member 172). Each end of rod 120 is rotationally coupled (e.g., via ball or plain bearings) to a respective one of seat frame members 171, 172. A support member 150 is transversely oriented and mechanically secured to seat frame members 171, 172. Support member 150 provides a mechanical support for mounting motor 110 to the bucket assembly.

In embodiments, an optional gearbox 115 is mechanically coupled with motor 110 for providing a desired torque output and speed of rotation to rod 120. Gearbox 115 may be independently mounted to support member 150 to prevent the gearbox from rotating. In certain embodiments, rod 120 extends directly from the shaft of a spur gear of gearbox 115. In some embodiments, motor 110 includes a motor driver which activates the motor. The motor driver accurately controls the speed and start/stop of motor 110. An exemplary motor driver 359 is described below in connection with FIG. 3.

At least one cable mechanically couples rod 120 to at least one locking mechanism, respectively, as further described below. In operation, as rod 120 is rotated to the released position via motor 110, the at least one cable pulls on its respective locking mechanism to release it, thereby freeing the bucket assembly to enable its movement with respect to the seat base. Except when actively pulled to the released position, the at least one locking mechanism is by default biased (e.g., spring loaded) to remain in the locked position. In certain embodiments, the at least one cable is spring loaded such that when motor 110 is off, one or more springs extend the cable to pull on rod 120 and counter-rotate rod 120 back to its default locked position as further described below in connection with FIG. 4. In some embodiments, rod 120 includes its own dedicated biasing mechanism, such as a torsion spring (not shown), which maintains rod 120 in the locked position. The torsion spring may be mounted to one of seat frame members 171, 172 or to motor 110 for example, and connected via one end to rod 120.

Upon initiation by the user (described below), rod 120 is rotated along its longitudinal axis by motor 110 to the released position, thereby overcoming the spring force of the one or more springs. In embodiments, motor 110 is aligned in parallel with rod 120 such that rotation of motor 110 is aligned with rotation of rod 120. Motor 110 remains engaged for holding rod 120 in the released position while the user adjusts a position of the bucket assembly (e.g., the forward/aft position, the inboard/outboard position, and/or the swivel-rotation position). In other words, motor 110 is capable of maintaining a constant motor position at zero rotational speed in order to maintain rod 120 in the released position.

When initiation of powered seat-base release system 100 is ceased by the user, rod 120 is returned to the default locked position via the one or more springs thereby locking the bucket assembly in its current position. Notably, this requires that motor 110 and gearbox 115 be capable of being back driven. For example, the gears must be back drivable (e.g., not worm gears, which are not back drivable). Motor 110 and gearbox 115 transmit torque to rod 120 to overcome mechanical forces and release the at least one locking mechanism via the at least one cable to free the bucket assembly. When there is a loss of electrical power or other failure of motor 110, the motor may be reverse driven to return rod 120 to the locked position. This is an important consideration for use onboard aircraft since the seat must be locked in a fixed position for safety of the passenger in the event of an electrical outage.

Motor 110 does not need to provide sustained motion or rapid motion because only fractional rotation of rod 120 is needed to release the locking mechanisms (e.g., rod 120 rotates less than one full rotation between locked and released positions). However, motor 110 is configured to accurately hold rod 120 in the released position without overheating. For example, motor 110 is a brushless direct-current (DC) electric motor or a stepper motor, but not a brushed DC electric motor. The motor preferably operates quickly and quietly and is small enough in physical size to fit within the bucket assembly. Additionally, motor 110 and optional gearbox 115 are rigidly fixed to rod 120 without the use of a clutch or solenoid or any other mechanism that would enable detachment between rod 120 and motor 110 under normal operation. In other words, rod 120 is continually connected to motor 110 and rod 120 may not be disconnected from motor 110 during planned use of system 100. In some embodiments, motor 110 may be operated in reverse to drive rod 120 to the locked position rather than, or in combination with, rotation to the locked position via the biasing mechanism. For example, the motor 110 may be operated in reverse to control the speed at which rod 120 counter rotates to the locked position.

In the embodiment depicted in FIG. 1, a plurality of cables are each mechanically coupled to rod 120 via a lever arm. Each of the cables are for example metal wire cables housed in a sheath. For example, a first cable 131, a second cable 132, an optional third cable 133, and an optional fourth cable 134 are each mechanically coupled to rod 120. In embodiments, the first cable 131 mechanically couples a manual override lever 140 to rod 120. The manual override lever 140 enables a user to mechanically rotate rod 120 into the released position in the event of a loss of function of motor 110 (e.g., due to a loss of electrical power). Additional cables (e.g., second, third, and fourth cables 132-134) each mechanically couple rod 120 to a respective locking mechanism. Exemplary cable routings include but are not limited to the following: second cable 132 mechanically couples to a first locking mechanism (see FIG. 4); third cable 133 mechanically couples to a second locking mechanism (not shown); and fourth cable 134 mechanically couples to third locking mechanism (not shown). In certain embodiments, first locking mechanism provides a brake assembly that releasably secures the inboard/outboard tracking and a swivel plate; second and third locking mechanisms are brake assemblies used to releasably secure forward/aft seat tracking. In some embodiments, each locking mechanism is configured to control a different direction of travel.

In embodiments, the plurality of cables 131-134 each pass through a respective hole in support member 150. Couplings may be adapted to secure each cable sheath to support member 150 (e.g., nuts may be used on both sides of support member 150 to secure the cable sheath). The cables 131-134 are each able to freely slide within their respective sheath.

Figure 2:
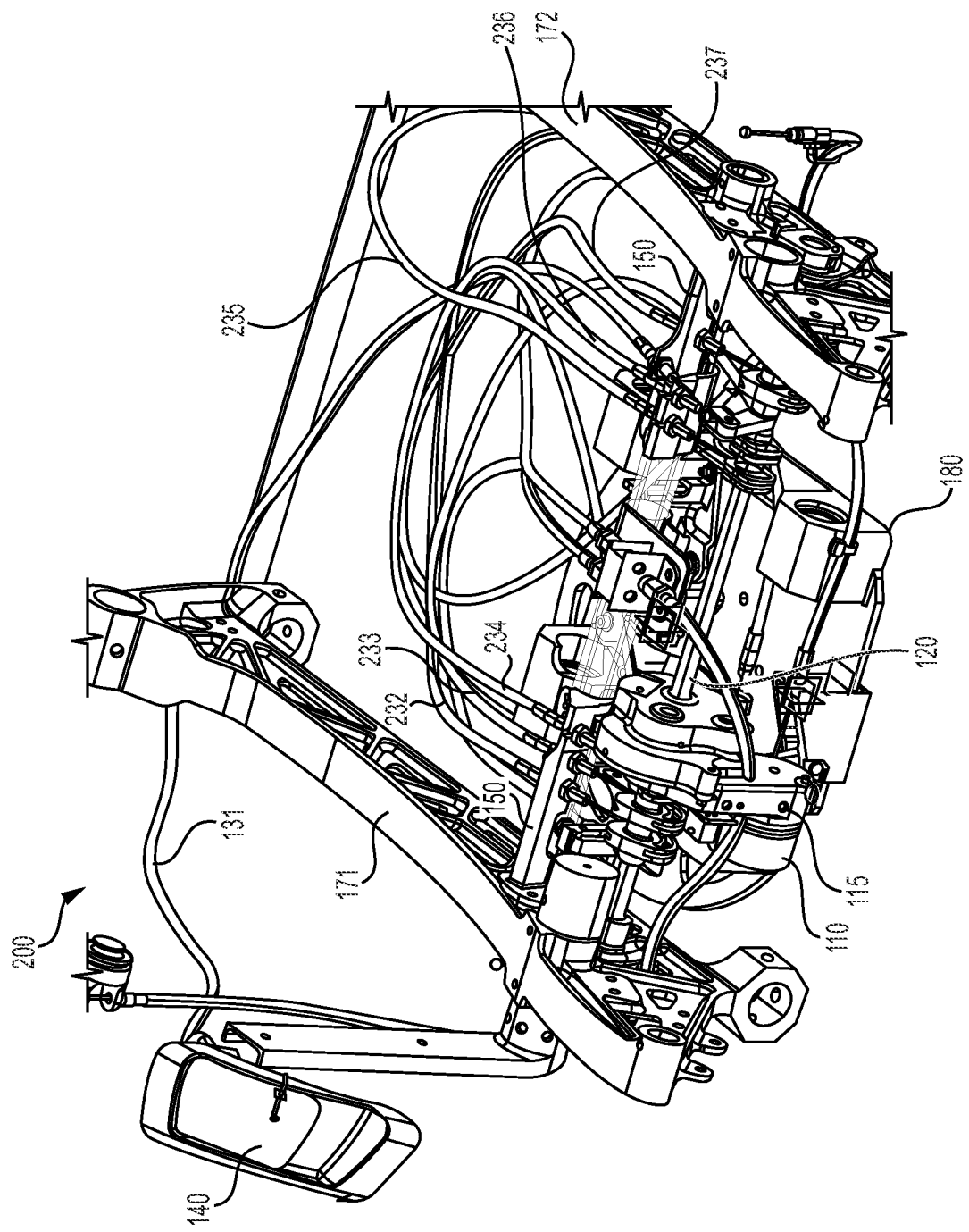
FIG. 2 is a perspective view showing another embodiment of a powered seat-base release system.

FIG. 2 is a perspective view showing an exemplary powered seat-base release system 200 incorporated in an exemplary bucket assembly of an aircraft seat. Not all components of the bucket assembly are shown in FIG. 2 for clarity of illustration. Items enumerated in FIG. 2 with like numerals from FIG. 1 are the same or similar and their description may not be repeated accordingly.

Like the embodiment of FIG. 1, motor 110 mechanically couples with rod 120 via gearbox 115 for rotating rod 120 along its longitudinal axis at a predetermined torque and speed. In system 200, motor 110 and gearbox 115 are mounted to support member 150 which is transversely oriented between first and second seat frame members 171, 172. Similar to the embodiment of FIG. 1, first cable 131 mechanically couples manual override lever 140 to rod 120 for providing a manual override option in the event of a failure of, or loss of power to, motor 110. Viewable in FIG. 2 (but not in FIG. 1) is a swivel plate 180 adapted for swiveling (e.g., spinning) the bucket assembly with respect to the seat base such that the user is able to rotate the seat towards their left or their right.

Similar to the embodiment of FIG. 1, a plurality of additional cables are each mechanically coupled to rod 120 via a lever arm. Exemplary cable routings include but are not limited to the following: second cable 232, fourth cable 234, sixth cable 236, and seventh cable 237 each mechanically couple to a locking mechanism for releasably securing forward/aft tracking; third cable 233 mechanically couples to a locking mechanism for inboard/outboard tracking; a fifth cable 235 mechanically couples to a locking mechanism for releasably securing the swivel plate. The locking mechanisms are not shown in FIG. 2 for clarity of illustration (see e.g., FIGS. 3 and 4 instead).

Figure 3:
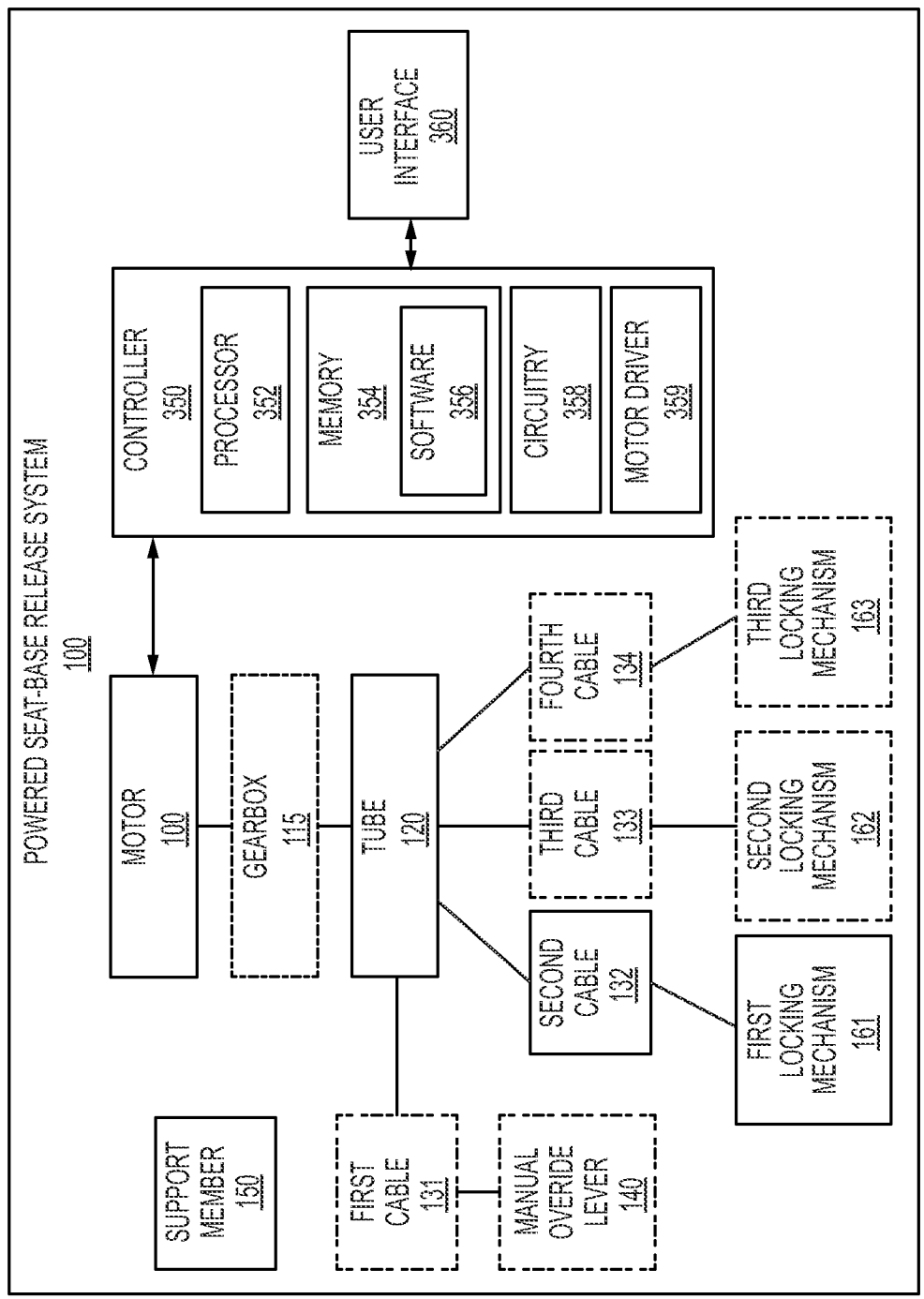
FIG. 3 is a block diagram showing the powered seat-base release system of FIG. 1.

FIG. 3 is a block diagram of exemplary powered seat-base release system 100. Again, system 100 includes motor 110, and optionally gearbox 115 operatively coupled to the motor 110. In embodiments, motor 110 and gearbox 115 are each independently mounted to support member 150. Rod 120 is mechanically coupled to gearbox 115 for rotating between a locked position and a released position. Optional first cable 131 mechanically couples manual override lever 140 to rod 120 for rotating rod 120 when motor 110 is unavailable (e.g., due to a loss of power or some other failure). Second cable 132, optional third cable 133, and optional fourth cable 134 each mechanically couple to rod 120 (e.g., via a lever arm) at a first end of their respective cable. Via a second end of each respective cable, the cables 132-134 each mechanically couple to a different locking mechanism (e.g., a first locking mechanism 161, an optional second locking mechanism 162, and an optional third locking mechanism 163), respectively. Each of the locking mechanisms may be used to prevent movement of the bucket assembly in a different direction/orientation. The cables and/or locking mechanisms are each spring loaded (see e.g., FIG. 4) such that the default position of rod 120 is the locked position. When motor 110 is turned on, rod 120 is rotated to the released position, which pulls cables 132-134 to overcome the spring forces and release the locking mechanisms 161-163, which enables movement of the bucket assembly (e.g., forward/aft tracking, inboard/outboard tracking, and swiveling).

In certain embodiments, system 100 includes a controller 350, which may include one or more microcontrollers, microprocessors, and/or programmable logic controllers (PLCs) and one or more printed circuit boards (PCBs) communicatively coupled with one another and with motor 110. In some embodiments, motor 110 includes an integrated microcontroller/microprocessor which communicatively couples with a separate PCB. A user interface 360 enables user inputs for activating/deactivating motor 110, as further described below.

Controller 350 includes a memory 354, including a non-transitory medium for storing software 356, and a processor 352 for executing instructions of software 356. Memory 354 may be used to store information used by controller 350, including but not limited to instructions, algorithms, lookup tables, etc. Circuitry 358 includes wires and PCB traces for communicatively and electrically coupling components of controller 350 with motor 110 and user interface 360. For example, circuitry 358 includes an electrical connector that provides electrical power and ground, and another electrical connector that transmits an input signal from user interface 360 and returns feedback from motor 110 via a motor driver 359. In some embodiments, circuitry 358 includes a master circuit board that incorporates circuitry from motor 110 and circuitry from user interface 360 (e.g., a capacitance switch). Motor driver 359 may be included in the master circuit board or directly integrated with motor 110. Controller 350 is not limited by the materials from which it is formed or the processing mechanisms employed therein and, as such, may be implemented via semiconductor(s) and/or transistors (e.g., electronic integrated circuits (ICs)), and so forth.

User interface 360 enables user input for transmitting instructions to motor 110. For example, user input provides signals to controller 350 to activate motor 110 for enabling movement of the bucket assembly, as well as to deactivate motor 110 to lock the bucket assembly in place. In certain embodiments, user interface 360 includes one or more buttons or switches (e.g., a momentary switch or a physical button) located on an armrest of the seat, or at another location such as a side ledge adjacent the seat.

In certain embodiments, user interface 360 includes a capacitance switch or a resistance touch switch that may be activated by a user's touch. For example, a touch sensor (such as the capacitive sensor) measures changes to a touchpad. Sensitivity of the touch sensor is configured to eliminate false activation while still being responsive to intentional touch inputs. When the sensor is activated, an input signal is transmitted to the motor driver, which activates motor 110. Feedback from the motor driver may transmit signals for temperature, torque, position, and speed of motor 110. For example, temperature information may be stored in memory 354 and used by controller 350 to prevent overheating of motor 110. Controller 350 may determine the torque output based on an amount of electrical current being drawn by motor 110 and using e.g., an algorithm and/or a lookup table stored in memory 354.

In some embodiments, user interface 360 includes a touch screen display device configured for receiving touch indications by the user. The touch screen display device may be located in the vehicle cabin (e.g., on the seat armrest or an adjacent side ledge) and/or accessed remotely via a mobile device (e.g., smartphone, tablet, or laptop computer). User interface 360 may be configured to present a menu for selecting a locked state and a released state of the bucket assembly corresponding to the locked position and the released position of rod 120.

User interface 360 is preferably configured to avoid accidental activation by the user. For example, a button or switch may be located on an adjacent side ledge rather than an armrest; a capacitance switch may require a touch of a predetermined duration (e.g., two or three seconds) by the user; a touch screen device may require a confirmation query (e.g., this will release seat base, okay?) and subsequent user input (e.g., yes/no). Many other means of preventing accidental activation may be employed without departing from the scope hereof.

Upon activation via user interface 360, motor 110 rotates rod 120 into the released (e.g., unlocked) position and holds rod 120 there for as long as the user activation is sensed. When user activation ceases, or if electrical power or motor function is lost, biasing (e.g., spring) forces reverse drive motor 110 to the locked position to secure the bucket assembly to the seat base.

In some embodiments, system 100 is configured to provide a power assist in which a portion of the mechanical force needed to release the locking mechanisms is provided via motor 110, while the remaining force is provided by the user via a mechanical lever-handle. For this scenario, user interface 360 is integrated with a mechanical lever-handle such that the motor is activated simultaneously while the user pulls the lever-handle. For example, a capacitance-type switch may be located on an underside surface of the lever-handle such that the switch is activated while the user grasps and pulls the lever-handle. For the power-assist embodiment, manual override lever 140 is replaced with a lever handle that includes an integrated user interface 360 (e.g., a capacitance-type switch). The power-assist option supplements the force provided by the manual lever-handle to reduce finger loads and improve consistency of operation and feel. As a user pulls on the lever-handle, motor 110 provides the power assist, or if insufficient force is provided by the user via the lever-handle, motor 110 will take over to provide sufficient torque to rod 120. In the event of a loss of electrical power or other failure of motor 110, the lever-handle functions as a backup like manual override lever 140 of FIG. 1.

In certain embodiments, motor 110 includes Hall-effect sensors and an encoder that are used to measure a position of motor 110 and gearbox 115, and to provide feedback to the motor driver to ensure rod 120 is in a predetermined position (e.g., the released position or the locked position). In this manner, when system 100 is powered on, controller 350 determines where motor 110 is located. In some embodiments, the Hall-effect sensors are integrated within motor 110 and used via the motor driver for controlling the motor. Velocity and position information about motor 110 may be received from the Hall sensors by controller 350. Alternatively, an additional encoder (e.g., an absolute encoder) may be used to provide velocity and position information about motor 110 to controller 350.

In embodiments, an enclosure is provided to package motor 110 and gearbox 115 and any circuit boards associated with controller 350 such that the enclosure provides protection from moisture, electro-magnetic interference (EMI), dust, and other contaminants. Additionally, the enclosure may be configured to reduce noise produced by motor 110, and the enclosure may include attachment features for mounting to support member 150.

Figure 4:
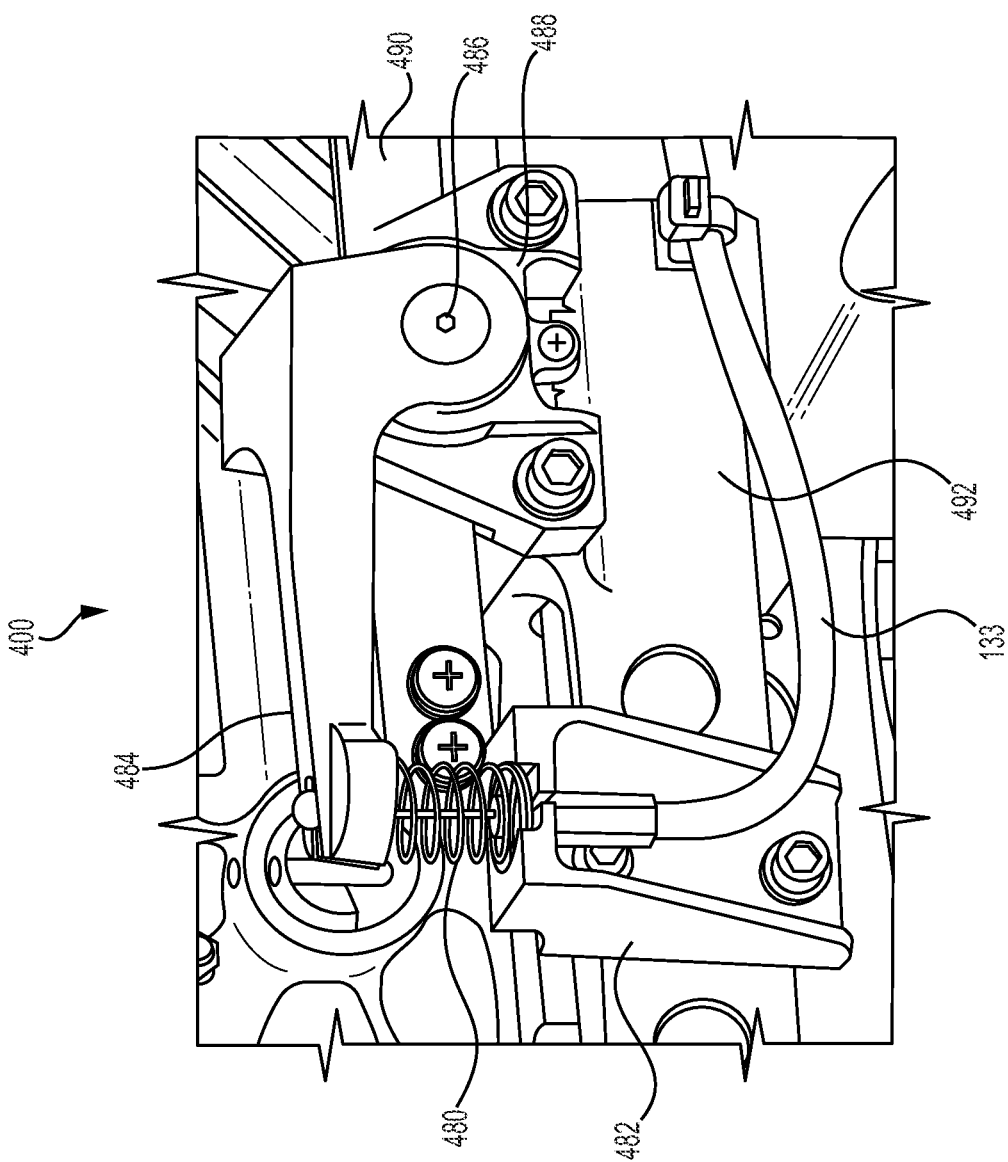
FIG. 4 is a perspective view of a locking mechanism, in an embodiment, that may be used with the powered seat-base release system of FIG. 1.

FIG. 4 is a perspective view of an exemplary forward/aft brake assembly 400 that may be used with system 100 of FIG. 1. Such a forward/aft brake assembly has been previously described in U.S. Pat. No. 10,266,270, which is hereby incorporated in reference in its entirety. Forward/aft brake assembly 400 is an example of a locking mechanism (such as second locking mechanism 162 of FIG. 3) adapted to releasably secure forward/aft tracking of a bucket assembly with respect to a seat base. As depicted in FIG. 4, a biasing member 480 may be a compression spring concentrically aligned around third cable 133 of FIG. 1. Biasing member 480 is constrained between a bracket 482 and a lever arm 484. Third cable 133 is routed through a slot in bracket 482, and an end of third cable 133 is mechanically coupled to a distal end of lever arm 484. Together, motor 110, rod 120, third cable 133, biasing member 480, and lever arm 484 are adapted to actuate a locking mechanism used to releasably secure forward/aft tracking of the bucket assembly with respect to the seat base.

In operation, biasing member 480 provides an upward force to a first end of lever arm 484, causing clockwise rotation about an axis 486. The clockwise rotation is translated to a pair of opposing brake pads (not shown) within a caliper housing 488 such that the brake pads move towards one another to contact a braking plate 490 (see U.S. Pat. No. 10,266,270, incorporated by reference, for more details). Braking plate 490 is mechanically coupled to the bucket assembly, whereas caliper housing 488 is mechanically coupled to a track block 492 of the seat base. In this manner, the biasing member 480 biases brake assembly 400 into the locked position for securing the bucket assembly with respect to the seat base. Additionally, when biasing member 480 provides the upward force to the first end of lever arm 484, the lever arm 484 pulls on the end of third cable 133, which pulls on rod 120 to counter-rotate rod 120 and reverse drive motor 110 as described above.

To release brake assembly 400, motor 110 rotates rod 120 (see FIG. 1), thereby pulling third cable 133 which pulls downwardly on the distal end of lever arm 484 to rotate counter-clockwise about axis 486. The counter-clockwise rotation is translated to the pair of opposing brake pads within caliper housing 488 such that the brake pads move away from one another to release braking plate 490, thereby unlocking the brake assembly 400 to enable motion of the bucket assembly with respect to the seat base.

Advantages provided by powered seat-base release systems 100, 200 include enabling individuals with limited hand strength to release the bucket assembly while also making the releasing action feel and act more consistently. Systems 100, 200 also provide more options for industrial designers to develop the aesthetics of the seat and its controls.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A powered seat-base release system, comprising:
   a rod rotatably mounted in a bucket assembly of an aircraft seat;
   a motor mechanically coupled to the rod, wherein the motor is configured for rotating the rod from a locked position to a released position;
   a locking mechanism configured for preventing motion of the bucket assembly;
   a cable having a first end and a second end, the first end being mechanically coupled to the rod, and the second end being mechanically coupled to the locking mechanism;
   a user interface configured to activate the motor for rotating the rod to the released position such that the rod pulls the cable thereby releasing the locking mechanism to enable motion of the bucket assembly; and
   a biasing mechanism, wherein upon deactivation of the motor, the biasing mechanism is configured to counter rotate the rod from the released position to the locked position thereby back driving the motor.

2. The system of claim 1 comprising a gearbox operatively coupled to the motor, wherein the gearbox is configured to rotate the rod at a desired torque output and a desired speed of rotation.

3. The system of claim 2 wherein the gearbox comprises a spur gear and the rod is configured to extend directly from a shaft of the spur gear.

4. The system of claim 2 wherein gears of the motor and the gearbox are capable of being back driven such that upon loss of electrical power the motor may be reverse driven to return the locking mechanism to a locked orientation via the rod.

5. The system of claim 1 wherein the motor is a brushless direct-current electric motor capable of being back driven.

6. The system of claim 1 wherein the motor is a stepper motor capable of being back driven.

7. The system of claim 1 wherein the user interface comprises a momentary switch configured for transmitting a signal to the motor for activating the motor.

8. The system of claim 1 wherein the user interface comprises a capacitance switch configured for touch activation by a user for transmitting a signal to the motor for activating the motor.

9. The system of claim 1 wherein the user interface comprises a touch screen display device configured to present a menu for selection of a locked state and a released state of the bucket assembly.

10. The system of claim 1 comprising a motor driver configured to activate the motor, wherein the user interface is configured to transmit an input signal to the motor driver for activating the motor.

11. The system of claim 1 wherein the biasing mechanism comprises a torsion spring operatively coupled to the rod, wherein the torsion spring is configured for counter-rotating the rod from the released position to the locked position thereby back driving the motor.

12. The system of claim 1 wherein the biasing mechanism comprises a compression spring operatively coupled to the locking mechanism and the cable, wherein the compression spring is configured for returning the locking mechanism to the locked position and for pulling the cable to counter-rotate the rod from the released position to the locked position thereby back driving the motor.

13. The system of claim 1 comprising a manual override lever and a second cable, wherein the second cable operatively couples the manual override lever to the rod such that actuation of the manual override lever pulls the second cable thereby rotating the rod to the released position for releasing the locking mechanism.

14. The system of claim 13 wherein the motor is configured to provide a power assist to pull the cable comprising:
   a portion of a force to pull the cable being provided by the manual override lever; and
   a remaining portion of the force to pull the cable being provided by the motor.

15. The system of claim 1 comprising a third cable and a second locking mechanism, wherein the third cable operatively couples the rod to the second locking mechanism such that rotating the rod by the motor to the released position pulls the third cable thereby releasing the second locking mechanism to enable motion of the bucket assembly in another direction.

16. The system of claim 1 comprising a controller, wherein the motor comprises at least one sensor configured to measure a position of the motor and the controller is configured to determine an orientation of the rod based on the position of the motor.

* * * * *